United States Patent
Chen

[11] Patent Number: 5,121,617
[45] Date of Patent: Jun. 16, 1992

[54] AUTOMOBILE THREE-STAGE STEERING-LOCK

[76] Inventor: Tian-Yuan Chen, No. 95-4, Min-Hsiang Road, Chung-Ho, Taipei Hsien, Taiwan

[21] Appl. No.: 739,480

[22] Filed: Aug. 2, 1991

[51] Int. Cl.⁵ .............................................. B60R 25/02
[52] U.S. Cl. ...................................... 70/209; 70/226; 70/238
[58] Field of Search ............... 70/209, 211, 212, 225, 70/226, 237, 238, 239

[56] References Cited

U.S. PATENT DOCUMENTS

| | | | |
|---|---|---|---|
| 4,848,110 | 7/1989 | Kuo | 70/38 C |
| 4,887,443 | 12/1989 | Wang | 70/209 |
| 4,974,433 | 12/1990 | Wang | 70/237 |
| 5,005,388 | 4/1991 | Lo | 70/209 |
| 5,022,246 | 6/1991 | Wang | 70/226 |
| 5,031,428 | 7/1991 | Jan et al. | 70/209 |
| 5,031,429 | 7/1991 | Wang | 70/209 |
| 5,040,388 | 8/1991 | Chen | 70/209 |
| 5,042,278 | 7/1991 | Wang | 70/226 |
| 5,062,282 | 11/1991 | Rong | 70/211 |

Primary Examiner—Renee S. Luebke
Assistant Examiner—Darnell M. Boucher
Attorney, Agent, or Firm—Bacon & Thomas

[57] ABSTRACT

An automobile three-stage steering lock comprising an elongated body member, an elongated tube member adapted to move in telescopic way in the body member, an elongated rod member adapted to move in telescopic way in the tube member, three hooks, each of which is provided in the body member, the tube member and the rod member for engaging a steering wheel and the edge of a windshield, and a locking mechanism associated with the body member allowing the tube member and the rod member to extend with respect to the body member and be locked at any of a plurality of positions.

2 Claims, 8 Drawing Sheets

AUTOMOBILE THREE-STAGE STEERING LOCK

BACKGROUND OF THE INVENTION

Figure 1:
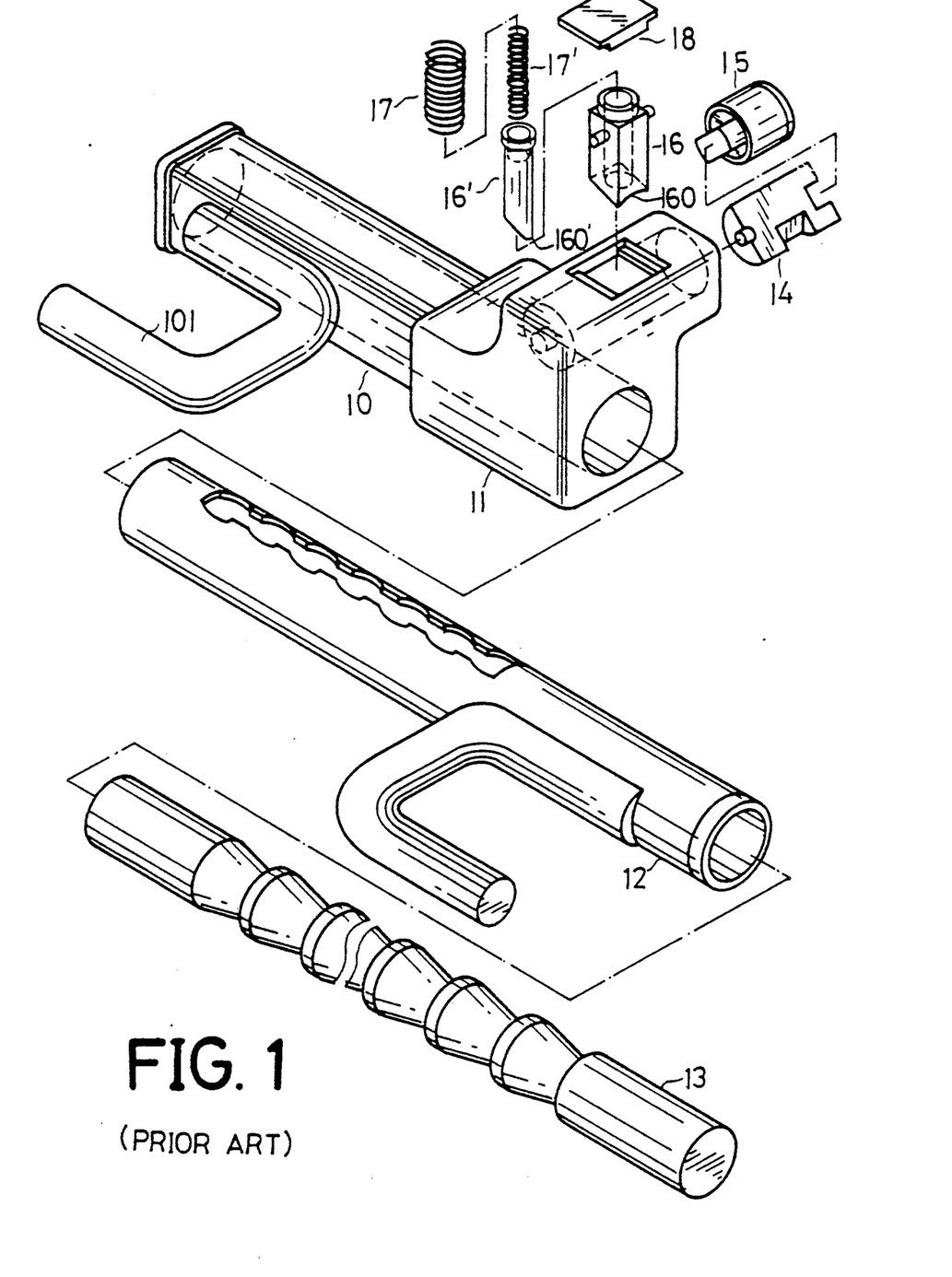
FIG. 1 is an exploded perspective view of a conventional automobile three-stage steering lock.
Figure 2:
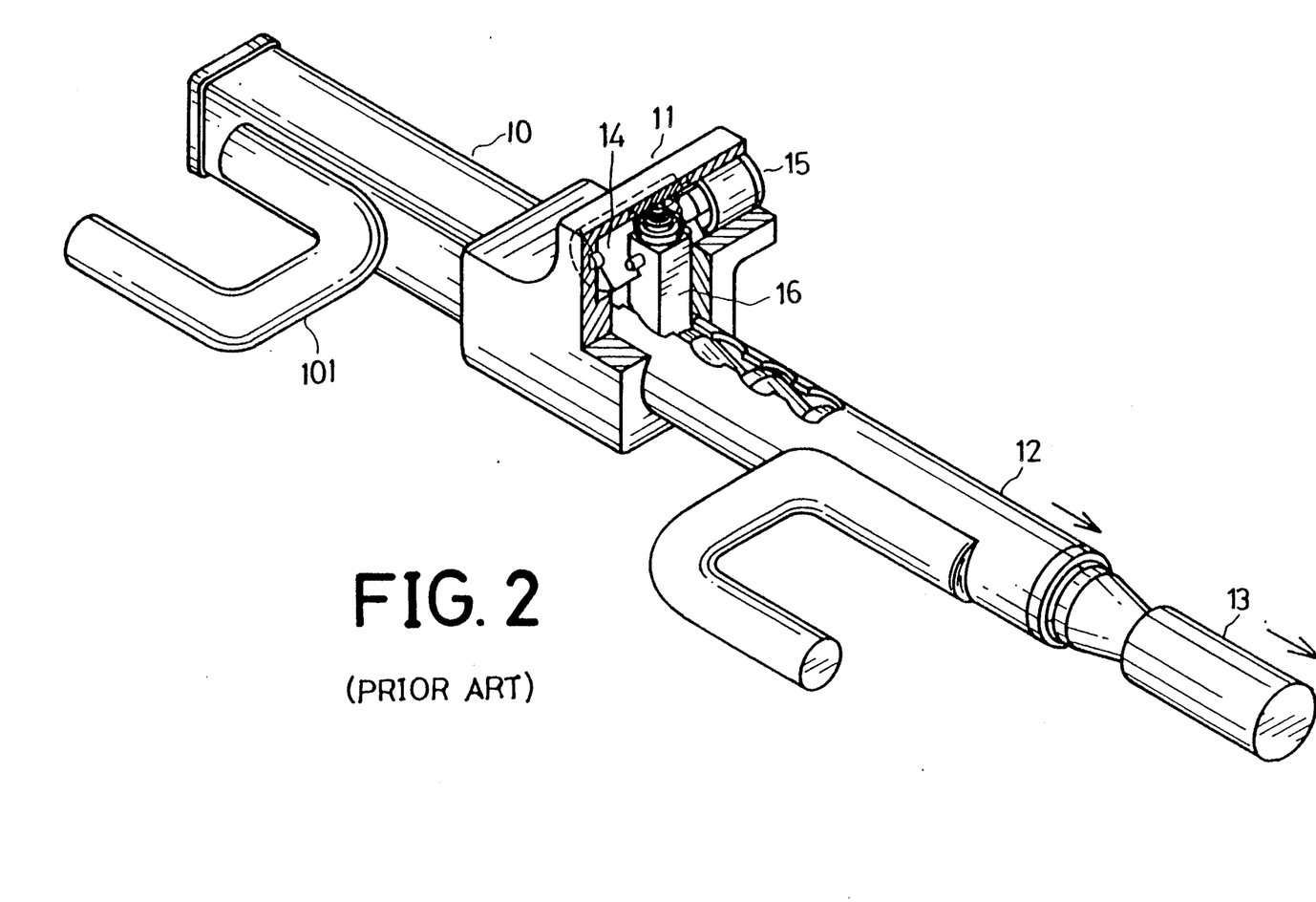
FIG. 2 is a perspective and part cross-sectional view of a conventional automobile three-stage steering lock wholly assembled.
Figure 3:
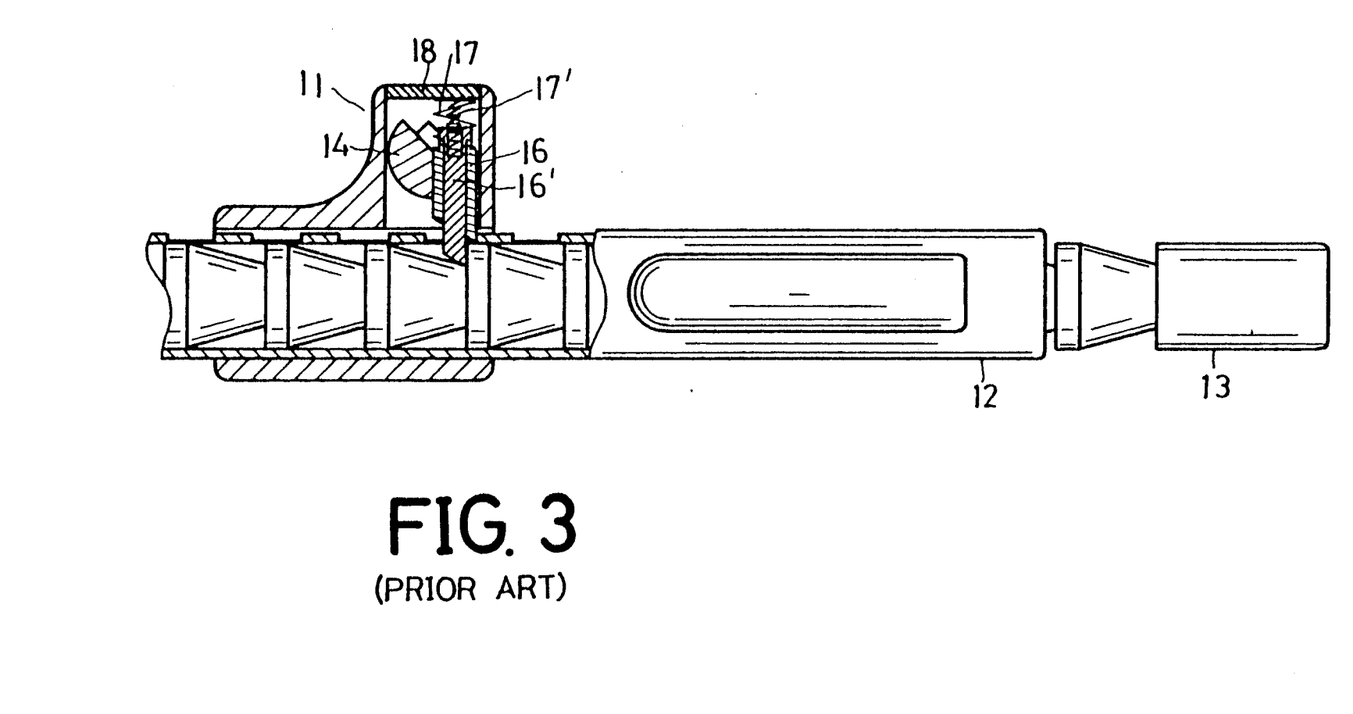
FIG. 3 is a cross-sectional view of the locking mechanism in a conventional automobile three-stage steering lock.

A conventional automobile three-stage steering lock, as shown in FIGS. 1-3, comprises an elongated body member 10, a lock housing 11, an elongated tube member 12, an elongated rod member 13, a locking means 14, a key lock 15, two locating means 16, 16' two coiled springs 17, 17' and a cap plate 18.

When the lock is to be applied on a steering wheel, a hook 101 in the body member is to be engaged with a steering wheel and then a hook of the elongated tube member 12 is to be engaged with the steering wheel and the elongated rod member 13 is to be telescoped freely within the body member 12 outward to a corner where a windshield and a car door meet. Meanwhile the locating means 16, 16' can slide along on the longitudinal surface of the rod member 13 and finally stop to fit in one of annular grooves in the rod member 13 to lock it immovable at a needed length, preventing the steering wheel from being turned around. Under this condition, the springs 17, 17' elastically push down the locating means 16, 16' so that the bottom ends 160, 160' of the locating means 16, 16' fit in one of the annular grooves of the rod member 13, keeping the rod member 13 from being pushed inward within the body member 10.

But the chances are that the tube member 12 and the rod member 13 can be completely pulled out of the body member 10 if they should be pulled with excessive force, and consequently they may hurt a user or a car window. Besides, if the lock should be held with the outer end of the rod member 13 down and the outer end of the body member up, the rod member 13 and the tube member 12 would easily slip out of the body member 10 because of their own weight.

SUMMARY OF THE INVENTION

The automobile three-stage steering lock in accordance with the present invention has been devised to improve the shortcoming mentioned above to have the advantage that an elongated rod member and an elongated tube member, whether in use or in storage, can be kept at a certain position without being completely removed from the elongated body member, thus preventing them from causing probable hurt to a person or a car window.

The structure of this lock has several features as follows.

1. An elongated rod member has an annular groove at the inner end for one of two locating means to lock therein by a spring pushing it down so as to keep this lock from completely moving out of a elongated body member.
2. The elongated rod member also has an annular groove at the outer side of a plurality of annular grooves for one of the locating means to lock in to keep this lock at the shortest length when it is not used.
3. Two locating means are linked and kept vertically parallel by a linking plate and accomodated in a bore in a lock housing and always pushed by two springs placed around their upper portions between a cap plate of the bore and two washers fitted around two annular grooves in their upper portions, and having respectively a bottom end consisting of an L-shaped wall at the left and a slope wall at the right. Then the bottom ends of the two locating means can fit in any of a plurality of pairs of fitting notches in the tube member and any of a plurality of annular grooves in the rod member so that both the tube member and the rod member can be locked at any of a plurality of positions with respect to the body member.

DETAILED DESCRIPTION OF THE INVENTION

Figure 4:
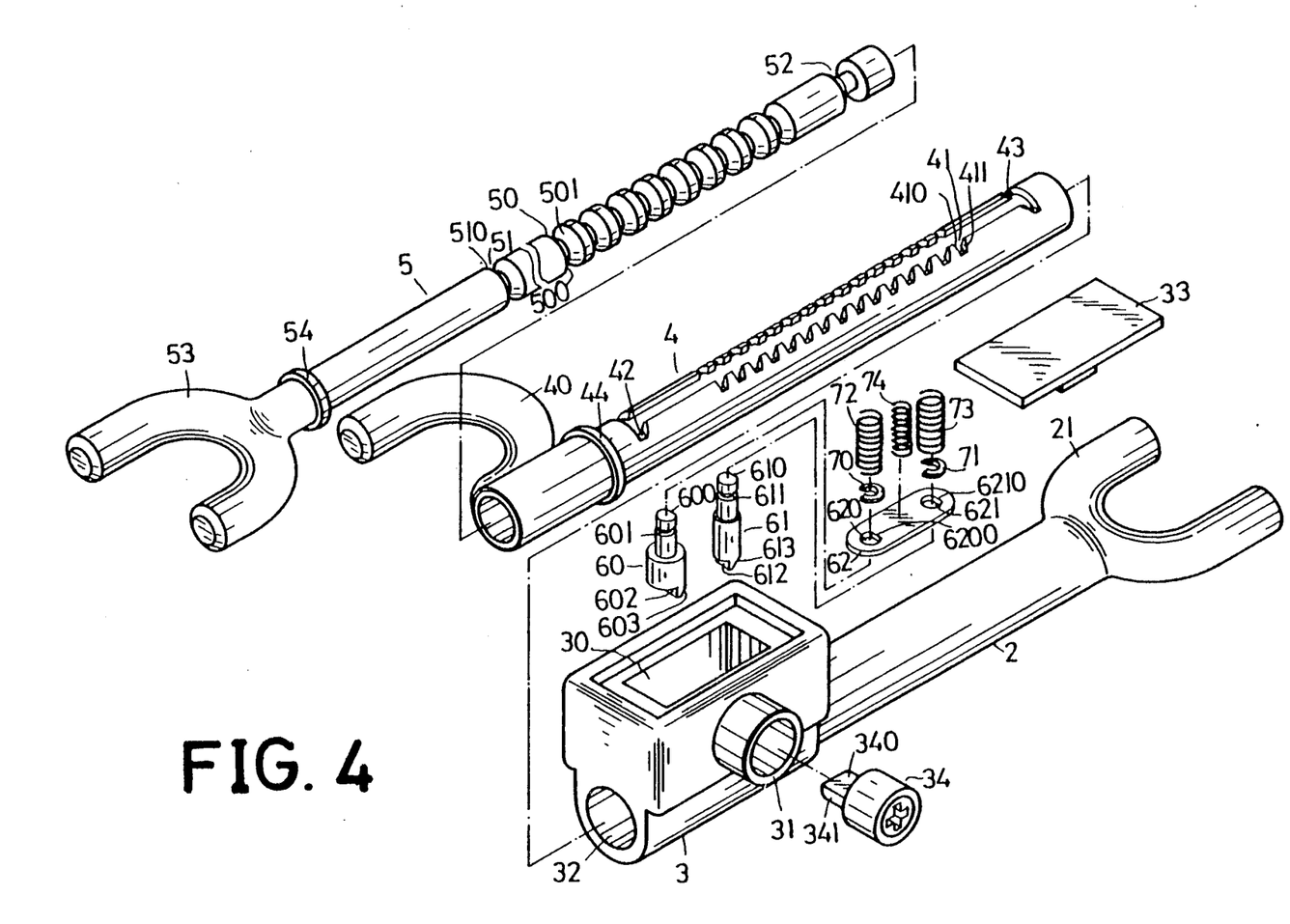
FIG. 4 is an exploded perspective view of an automobile three-stage steering lock in the present invention.
Figure 5:
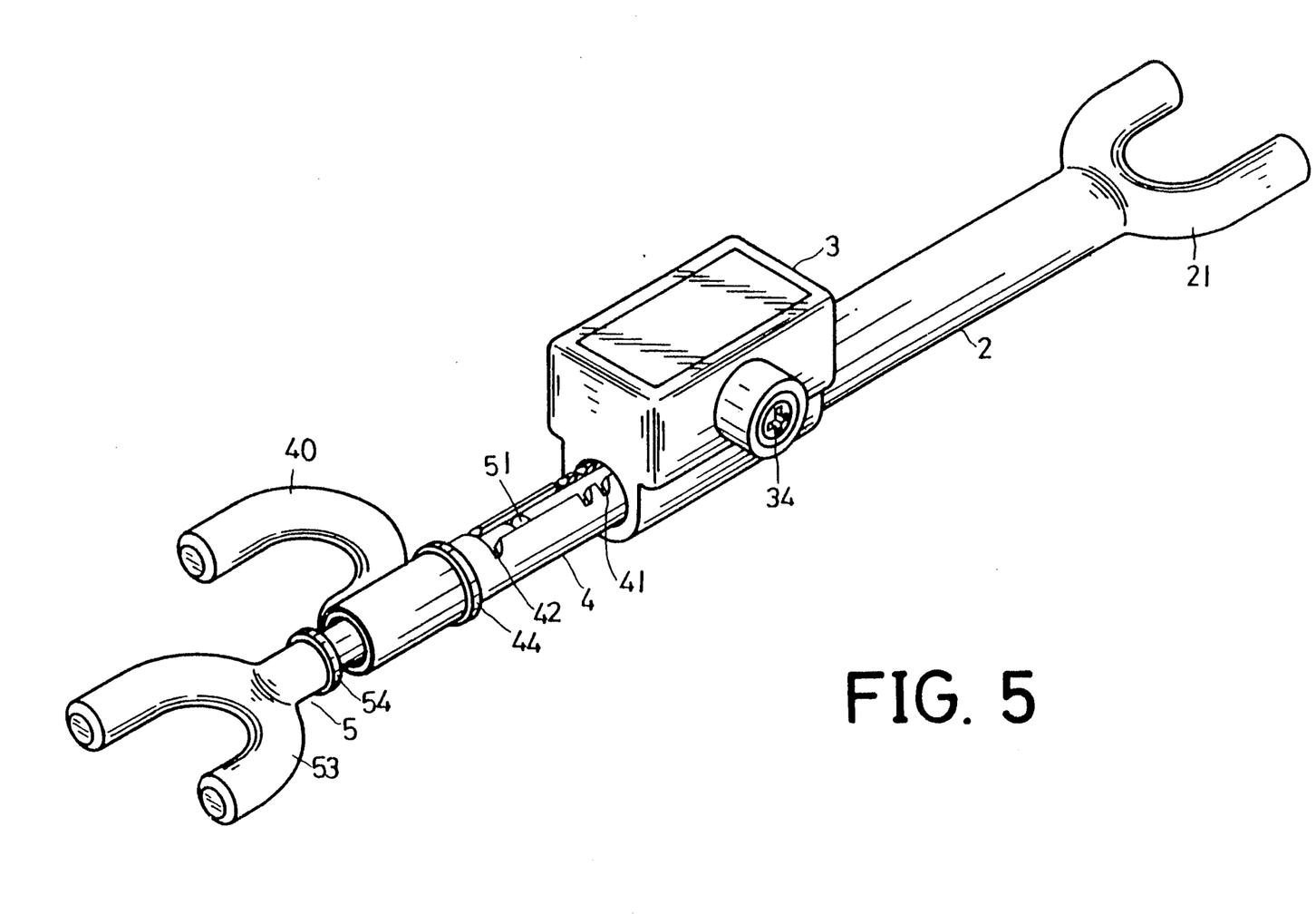
FIG. 5 is a perspective view of an automobile three-stage steering lock wholly assembled in the present invention.

An automobile three-stage steering lock in the present invention, as shown in FIGS. 4 and 5, comprises an elongated body member 2 which has its left end formed with a lock housing 3, an elongated tube member 4 which is dimensioned to move in telescopic way within the body member 2, a rod member 5 which is dimensioned to fit within the tube member 4, hooks 21, 40 and 53 for engaging opposite portion of a steering wheel from the inside thereof, being respectively provided in the body member 2, the tube member 4 and the rod member 5, a lock housing 3 for accomodating a lock mechanism including a key lock 34 and locating means 60, 61 linked with a linking plate 62 being provided therein.

The body member 2 has a central passage running through its body and exactly communicating with a passage 32 in the housing 3 for the tube member 4 to move in a telescopic way, and a U-shaped hook 21 at the right end to engage a portion of a steering wheel.

The tube member 4 has its outer diameter dimensioned slightly less than the diameter of the central passageway 32 of the housing 3 and the passageway of the body member 2 to enable said tube member 4 to telescope freely within the body member 2. The tube member 4 is provided with a plurality of fitting notches 41 spaced apart on both sides of a longitudinal opening in the upper wall. Each notch 41 has a vertical wall 410 at the left and a slope wall 411 at the right. A pair of notches 42 is also provided at the left end of the longitudinal opening and another pair of notches 43 at the right end of said opening. A hook 40 is welded sidewise at the left end of the tube member 4 to engage a portion of a steering wheel and a stop ring is provided around the outer surface near the hook 40.

The rod member 5 is properly dimensioned to telescope freely in the tube member 4 and provided with a plurality of annular grooves 50, each of which has a vertical wall 500 at the left and a slope wall 501 at the right, an annular groove 51 and another annular groove 52, respectively, at the left side and the right side of the group of annular grooves 50. The annular groove 51 has the same structure as the grooves 50 but the annular groove 52 has a reverse structure, i.e. a left slope wall and a right vertical wall. The rod member 5 also has a U-shaped hook 53 at the outer end and a stop ring 54 around on the outer surface near the hook 53.

The lock housing 3 is formed around the inner end portion of the body member 2, having a passageway 32 communicating axially with the central passageway of the body member 2 for the tube member 4 to telescope therein freely, a sidewise lock holder 31 for holding a conventional key lock 34, and a rectangular bore 30 for receiving two locating means 60, 61 linked with a linking plate 62 and three springs 72, 73, 74 therein.

The key lock 34 has a key hole and a locking means extending downward and having a flat portion 340 and a semi-circular portion 341.

The locating means 60, 61 respectively have an upper small-diameter portion and a lower large-diameter portion, a vertical wall 600, 610 at the upper right side, an annular groove 601, 611 in the upper portion, an L-shaped wall 602, 612 at the left of the bottom end, a slope wall 603, 613 at the right of the bottom end. The locating means 60, 61 are linked together vertically parallel with a linking plate 62, which has two through holes 620, 621 having respectively a straight wall 6200, 6210 so that when said two holes 620, 621 are fitted around the upper portions of the two locating means 60, 61, the locating means cannot rotate.

Two coiled springs 72, 73 are respectively fitted around the upper portions of said locating means 60, 61 between a cap plate 33 fixed at the opening of the bore 30 and washers 70, 71 fitted around the annular grooves 601, 611, and thus elastically push said locating means 60, 61. An extra coiled spring 74 is provided between the cap plate 33 and the linking plate 62 so as to elastically push said linking plate 62, as shown in FIGS. 6, 7, 8 and 9.

Figure 6:
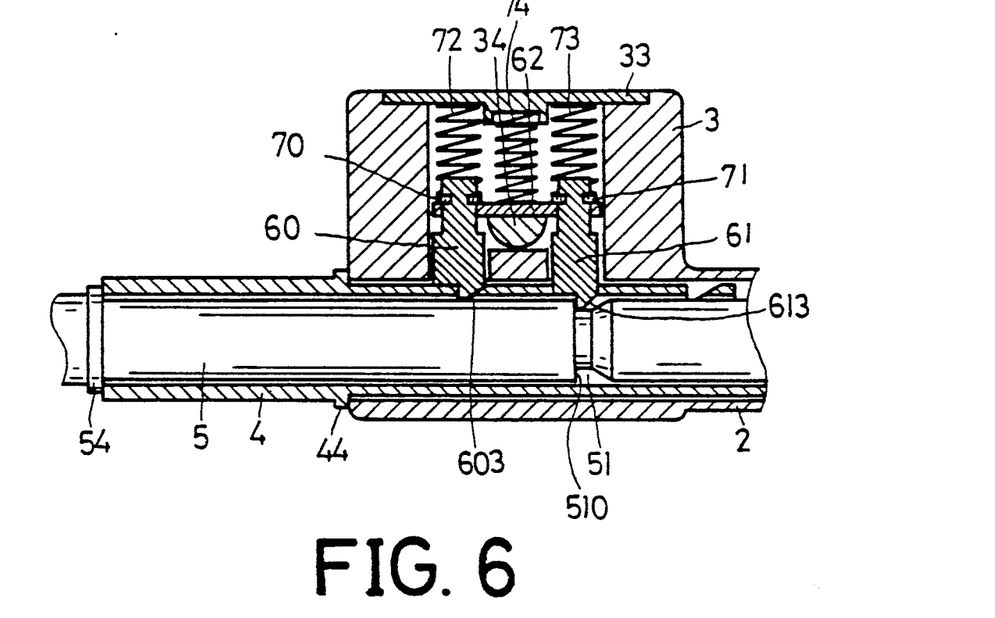
FIG. 6 is a cross-sectional view of the tube member and the rod member locked at an annular groove 51 by the locking mechanism in the present invention.
Figure 7:
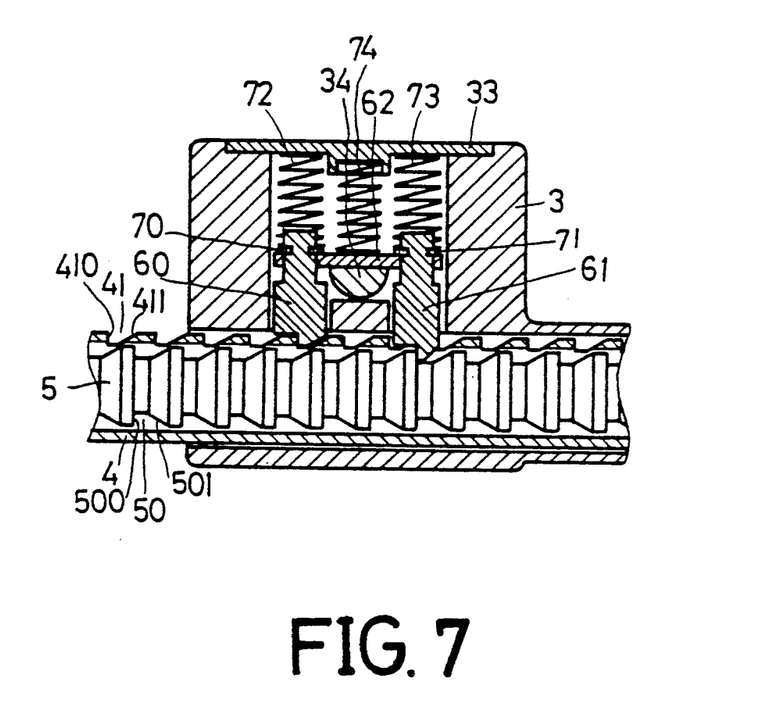
FIG. 7 is a cross-sectional view of the tube member and the rod member locked at two of the annular grooves 50 by the locking mechanism in the present invention.

When this lock is completely assembled and not yet applied to a steering wheel with the lock 34 locked, the two locating means 60, 61 are pushed down by three springs 72, 73, 74 as shown in FIG. 6, and accordingly their bottom ends are positioned to fit respectively in a pair of fitting notches 42 in the tube member 4 and the annular groove 51 of the rod member 5, preventing the tube member 4 and the rod member 5 from completely falling out of the body member 2 because of their own weight even if this lock should be held with the hook 53 down and the hook 21 up.

Figure 10:
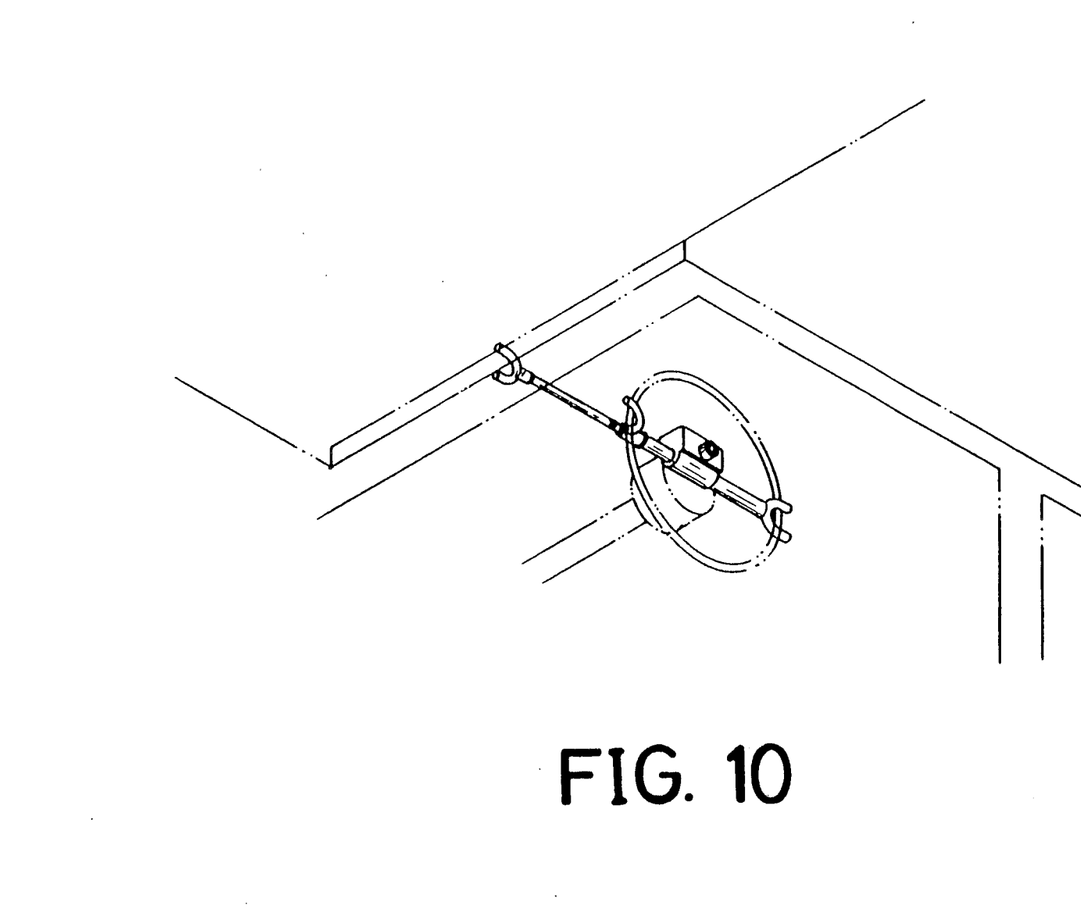
FIG. 10 is a perspective view of the lock in the present invention practically applied on a steering wheel.

When this lock is to be locked on a steering wheel, the hook 21 is at first to be engaged with a portion of the steering wheel from its inside, and next the tube member 4 is to be pulled outward in the body member 2 to engage the hook 40 on an opposite portion of the steering wheel to the hook 21. Then the rod member 5 is to be pulled outward in the tube member 4 to a certain length to reach the edge of the windshield so that the hook 53 can engage the edge of the windshield as shown in FIG. 10. After the hook 53 has engaged said edge, this lock has been locked on the steering wheel, which is then in immovable condition.

The elasticity of the springs 72 and 73 enables the bottom ends of the locating means 60, 61 to move sliding over the slope walls 501 of the annular grooves 50 in the rod member 5 when the rod member 5 and the tube member 4 are pulled only outward. If the rod member 5 and the tube member 4 are pulled inward, they are stopped by the vertical walls 410 of the fitting notches 41 in the tube member 4 and the vertical walls 500 of the annular grooves 50 in the rod member 5, which fit with the L-shaped walls 602, 612 of the locating means 60, 61. Therefore, once the rod member 5 is stopped at a certain position with the three hooks 21, 40, 54 properly engaged with a steering wheel and the edge of the windshield, this lock becomes locked and immovable.

If the tube member 4 and the rod member 5 should be pulled outward with excessive force, with the hooks 21 and 40 not yet accurately engaged against opposite portions of a steering wheel, the tube member 4 and the rod member 5 are stopped by the pair of fitting notches 43 and the annular groove 52 catching hold of the locating means 61, thus preventing said two members 4 and 5 from completely extending out of the body member 2, and avoiding injury to a person or damage to a car window.

Figure 8:
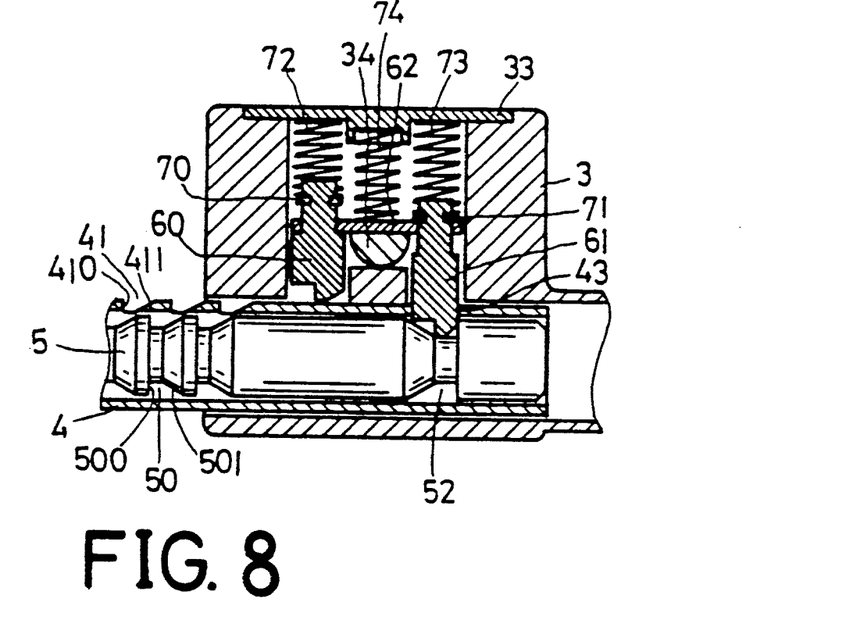
FIG. 8 is a cross-sectional view of the tube member and the rod member stopped at an annular groove 52 by the locking mechanism in the present invention.
Figure 9:
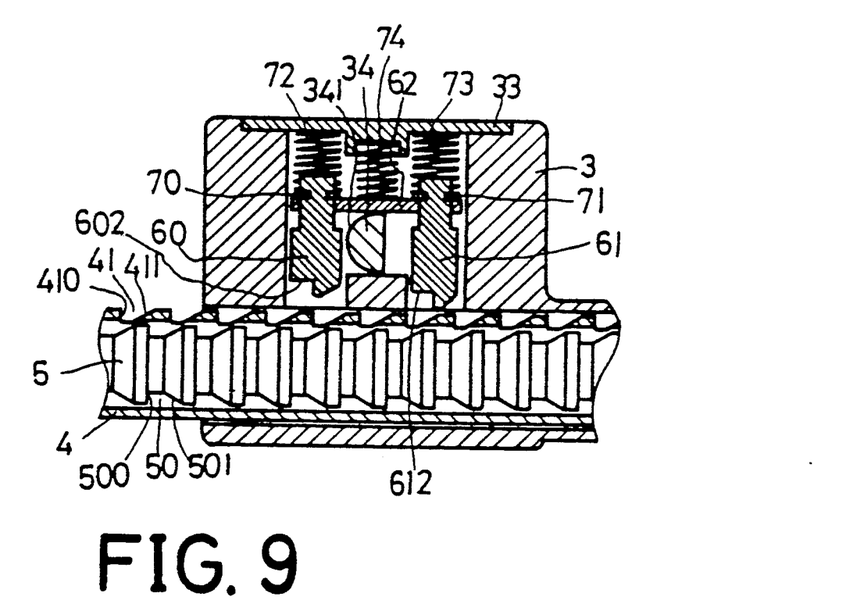
FIG. 9 is a cross-sectional view of the tube member and the rod member released from the locking mechanism unlocked by a correct key in the present invention.

If this lock mounted and locked on a steering wheel is desired to be released, as shown in FIG. 8, a correct key is to be used to rotate the lock 34 for about 90 degrees as shown in FIG. 9. Then the semi-circular portion 341 of the locking means is turned to push up the linking plate 62, which then pulls up the locating means 60, 61, compressing the two springs 72, 73 upwardly. Accordingly, the bottom ends or the L-shaped walls 602, 612 of said locating means 60, 61 leave the tube member 4 and the rod member 5, enabling thus said two members 4 and 5 to be pushed inwardly into the body member 2 and disengaging the hooks 21, 40, 53 from the steering wheel and the edge of the windshield.

What is claimed is:
1. An automobile steering lock comprising:
a) an elongate body member including an inner end and an outer end, a first U-shaped hook secured to the outer end and opening outwardly therefrom, and a longitudinal passageway through the body member;
b) an elongate tube member telescopically receivable in the longitudinal passageway of the body member, the tube member including an inner end, an outer end, a longitudinal passageway, a longitudinal opening, a plurality of first pairs of fitting notches on opposed sides of the opening, a second pair of fitting notches adjacent the inner end of the tube member, a third pair of fitting notches adjacent the outer end of the tube member, a second U-shaped hook secured to the outer end and opening outwardly therefrom, and an annular ring around the outer surface of the tube member adjacent the second U-shaped hook;
c) an elongate rod member telescopically receivable in the tube member, the rod member including an inner end and an outer end, a third U-shaped hook secured to the outer end and opening outwardly therefrom, a plurality of first annular grooves longitudinally spaced along a portion of the rod mem- ber, a second annular groove formed in the rod member adjacent the inner end, a third annular groove formed in the rod member between the first annular grooves and the outer end, and an annular ring formed around the outer surface of the rod member adjacent the third U-shaped hook;

d) a lock housing formed around the inner end of the body member, the housing including a side lock socket for holding a key lock, a housing passageway coaxially disposed with the longitudinal passageway of the body member, a rectangular bore communicating with the housing passageway, and a cap plate covering the bore;

e) a lock disposed in the lock socket, the lock including a locking member having a flat wall and an opposed semicircular wall;

f) a pair of locating means disposed in the rectangular bore of the lock housing, a link plate linking the locating means together and maintaining same in a parallel disposition adjacent the locking member, each locating means including an upper small diameter portion, a lower large diameter portion, a bottom end defined by an L-shaped wall and a sloping wall, an annular groove in the upper small diameter portion, a washer secured within the annular groove and a vertical wall in the upper small diameter portion engaged by the linking plate to prevent the locating means from rotating;

g) a pair of first springs disposed within the lock housing, each first spring engaging the upper portion of a locating means and the cap plate for urging the locating means towards the pairs of fitting notches in the tube member and the annular grooves in the rod member;

h) a third spring positioned between the cap plate and the linking plate for urging the linking plate towards the locking member; and i) when the locking member is disposed in a locking position, the flat wall is in engagement with the linking plate and the pair of locating means engage corresponding pairs of fitting grooves of the tube member and annular grooves of the rod member, and when the locking member is disposed in an unlocking position, by rotating the locking member 90°, the pairs of locating means are disengaged from the fitting grooves and annular grooves to permit retraction of the tube and rod members within the body member.

2. The automobile steering lock of claim 1 wherein:

a) the first and third annular grooves are each defined by a vertical sidewall positioned closer to the third U-shaped hook and a sloping sidewall positioned farther from the third U-shaped hook; and b) the second annular groove being defined by a vertical wall positioned farther from the second U-shaped hook and a sloping wall positioned closer to the third U-shaped wall.

* * * * *